US012508049B2

United States Patent
Masubuchi et al.

(10) Patent No.: US 12,508,049 B2
(45) Date of Patent: Dec. 30, 2025

(54) MEDICAL DEVICE AND METHOD FOR CONTROLLING MEDICAL DEVICE

(71) Applicant: TERUMO KABUSHIKI KAISHA, Tokyo (JP)

(72) Inventors: Yuki Masubuchi, Cupertino, CA (US); Takashi Kitaoka, San Jose, CA (US); Julia Werning, Redwood City, CA (US); Edward Solomon, Menlo Park, CA (US)

(73) Assignee: TERUMO KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 18/476,199

(22) Filed: Sep. 27, 2023

(65) Prior Publication Data
US 2024/0016514 A1     Jan. 18, 2024

Related U.S. Application Data

(63) Continuation of application No. PCT/JP2021/013851, filed on Mar. 31, 2021.

(51) Int. Cl.
*A61B 17/3207* (2006.01)
*A61B 17/00* (2006.01)

(52) U.S. Cl.
CPC ........... *A61B 17/320758* (2013.01); *A61B 17/320725* (2013.01); *A61B 2017/00075* (2013.01);
(Continued)

(58) Field of Classification Search
CPC .... A61B 17/320758; A61B 17/320725; A61B 2017/00075; A61B 2017/00734; A61B 2560/0214
See application file for complete search history.

(56) References Cited

U.S. PATENT DOCUMENTS 5,158,564 A * 10/1992 Schnepp-Pesch ............ A61B 17/320725
606/159
9,119,661 B2  9/2015 Rivers et al.
(Continued)

FOREIGN PATENT DOCUMENTS

JP    2009-090462 A    4/2009
JP    2011-098051 A    5/2011
(Continued)

OTHER PUBLICATIONS

English Translation of International Search Report dated May 25, 2021 mailed in counterpart International Application No. PCT/JP2021/013851, 2 pages.
(Continued)

*Primary Examiner* — Ashley L Fishback
(74) *Attorney, Agent, or Firm* — Kim & Stewart LLP

(57) ABSTRACT

A medical device for removing an object from a biological lumen, includes a rotatable structure for removing the object, a rotatable shaft to which the rotatable structure is connected at a distal portion of the shaft, a motor connected to the shaft and configured to generate a rotational force that is applied to the shaft, a motor drive circuit connectable to a power supply and configured to supply a current to the motor in a first direction to cause the motor to generate a rotational force in a first rotational direction and in a second direction that is opposite to the first direction to cause the motor to generate a rotational force in a second rotational direction that is opposite to the first rotational direction.

20 Claims, 9 Drawing Sheets

(52) U.S. Cl.
CPC .............. *A61B 2017/00734* (2013.01); *A61B 2560/0214* (2013.01)

(56) References Cited

U.S. PATENT DOCUMENTS

| | | |
|---|---|---|
| 11,696,782 B2 | 7/2023 | Carlson et al. |
| 2006/0071625 A1 | 4/2006 | Nakata et al. |
| 2014/0369477 A1 | 12/2014 | Okuno |
| 2019/0175874 A1* | 6/2019 | Tada ................. A61M 25/0013 |
| 2020/0222076 A1 | 7/2020 | Kitaoka et al. |

FOREIGN PATENT DOCUMENTS

| | | | |
|---|---|---|---|
| JP | 2021-506367 A | 2/2021 | |
| WO | 2013/093984 A1 | 6/2013 | |
| WO | 2019/069739 A1 | 4/2019 | |
| WO | WO-2019118522 A1 * | 6/2019 | ......... A61B 1/00133 |
| WO | 2020/189513 A1 | 9/2020 | |

OTHER PUBLICATIONS

English Translation of Written Opinion dated May 25, 2021, mailed in counterpart International Application No. PCT/JP2021/013851, 4 pages.

Notice of Reasons for Refusal mailed mailed Apr. 8, 2025 in corresponding Japanese Patent Application No. 2023-510022, 10 pages.

\* cited by examiner

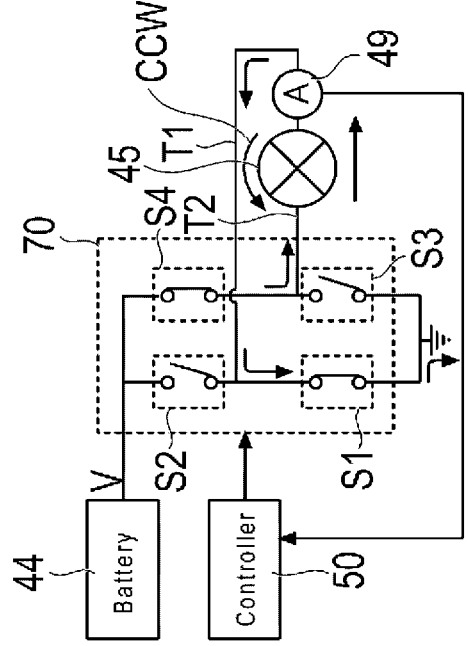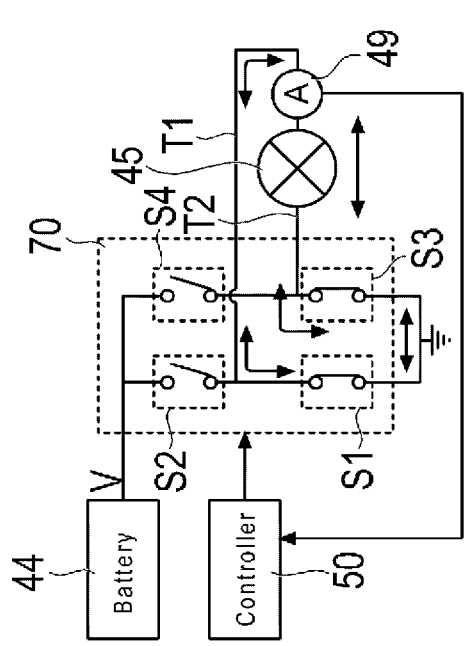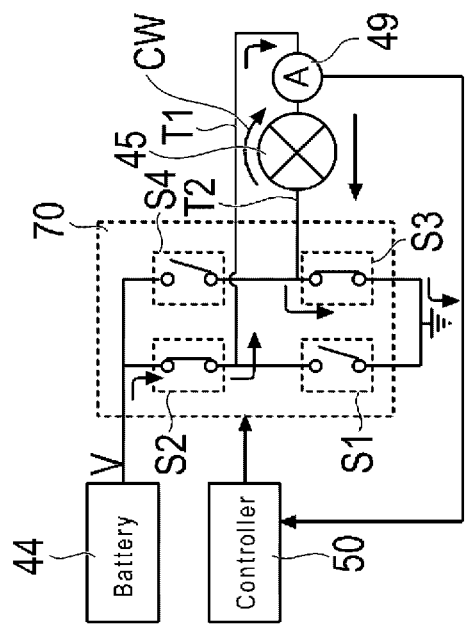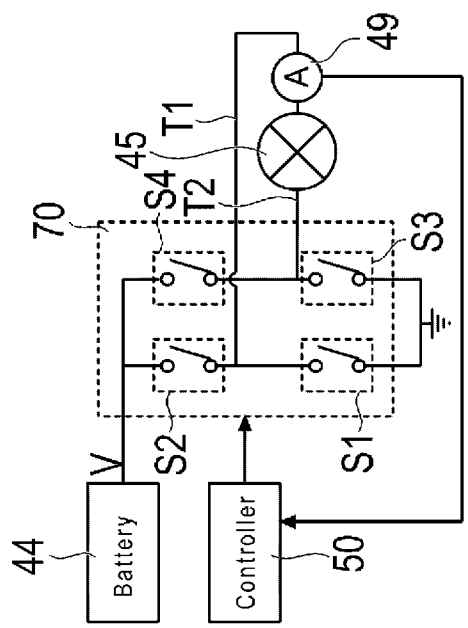
FIG. 4A
FIG. 4B
FIG. 4C
FIG. 4D

MEDICAL DEVICE AND METHOD FOR CONTROLLING MEDICAL DEVICE

CROSS-REFERENCE TO RELATED APPLICATION

This application is a continuation of International Patent Application No. PCT/JP2021/013851 filed Mar. 31, 2021, the entire content of which is incorporated herein by reference.

FIELD

Embodiments described herein relate generally to a medical device for removing an object from a biological lumen and a method for controlling a medical device.

BACKGROUND

When thrombus occurs in a biological lumen, it is necessary to quickly remove the thrombus. Examples of symptoms caused by such thrombus in the biological lumen include deep vein thrombus which causes thrombus in a vein in a deep part of a body, such as a femoral vein and a popliteal vein. As a method for treating such deep vein thrombus, there has been a method of inserting an elongated pipe body of a medical device into a blood vessel and injecting a drug such as a thrombolytic agent into an embolus portion to dissolve thrombus, thereby removing the thrombus.

In the treatment method in which the drug is injected to remove the thrombus, a side effect such as bleeding may occur. To avoid the side effect, there has been proposed use of an atherectomy device in which a member made of a wire provided at a distal portion of a shaft to be inserted into a blood vessel is rotated to contact and mechanically destroy an embolus (e.g., thrombus or the like) to increase a patency rate, i.e., a rate of a non-occluded region in a cross section of the blood vessel. Accordingly, a drug is not used, or an amount of drug used can be reduced.

In such an atherectomy device, a motor which rotates by electric power is used to rotate a structure interlocked to the distal portion of the shaft. When a torque is applied to the shaft, the shaft winds up to rotate the distal structure while accumulating torsion. When excessive torsion is accumulated in the shaft, the shaft or biological tissue may be damaged. Therefore, when the torque exceeds a certain threshold value, a current is cut off and the motor is freely rotated, thereby eliminating strain of the wound-up shaft and stopping the rotation.

In the atherectomy device, since the motor freely rotates immediately after the current cut-off, rotational energy in a direction of winding up the shaft, which is accumulated in a drive system as inertia, is further applied to the shaft. Therefore, an excessive torque exceeding the threshold value may be applied to the shaft or the biological tissue.

Additionally, when the wound-up shaft unwinds, the shaft freely rotates until the rotation stops. Therefore, the shaft winds up excessively in a reverse rotation direction to a wound-up direction, and a torque generated as a result may damage the shaft or the biological tissue.

SUMMARY OF THE INVENTION

Embodiments of the present disclosure provide a medical device and a method for controlling a medical device to prevent damage to a shaft of the medical device or biological tissue due to rotational energy accumulated in the motor or strain energy accumulated in the shaft.

In one embodiment, a medical device for removing an object from a biological lumen, comprises a rotatable structure for removing the object; a rotatable shaft to which the rotatable structure is connected at a distal portion of the shaft; a motor connected to the shaft and configured to generate a rotational force that is applied to the shaft; and a motor drive circuit connectable to a power supply and configured to supply a current to the motor in a first direction to cause the motor to generate a rotational force in a first rotational direction and in a second direction that is opposite to the first direction to cause the motor to generate a rotational force in a second rotational direction that is opposite to the first rotational direction.

The medical device described above can generate a braking force on the motor when reversing the direction of the rotational force. Accordingly, it is possible to quickly decelerate the shaft and the rotatable structure, and it is possible to avoid a state where an excessive force is applied to the shaft or the rotatable structure. Therefore, it is possible to effectively prevent the shaft or biological tissue from being damaged by rotational energy accumulated in the motor or strain energy of torsion accumulated in the shaft.

BRIEF DESCRIPTION OF THE DRAWINGS

FIGS. 4A-4D are circuit diagrams showing four states of a drive current generation circuit of the motor drive circuit.

DETAILED DESCRIPTION

Figure 1:
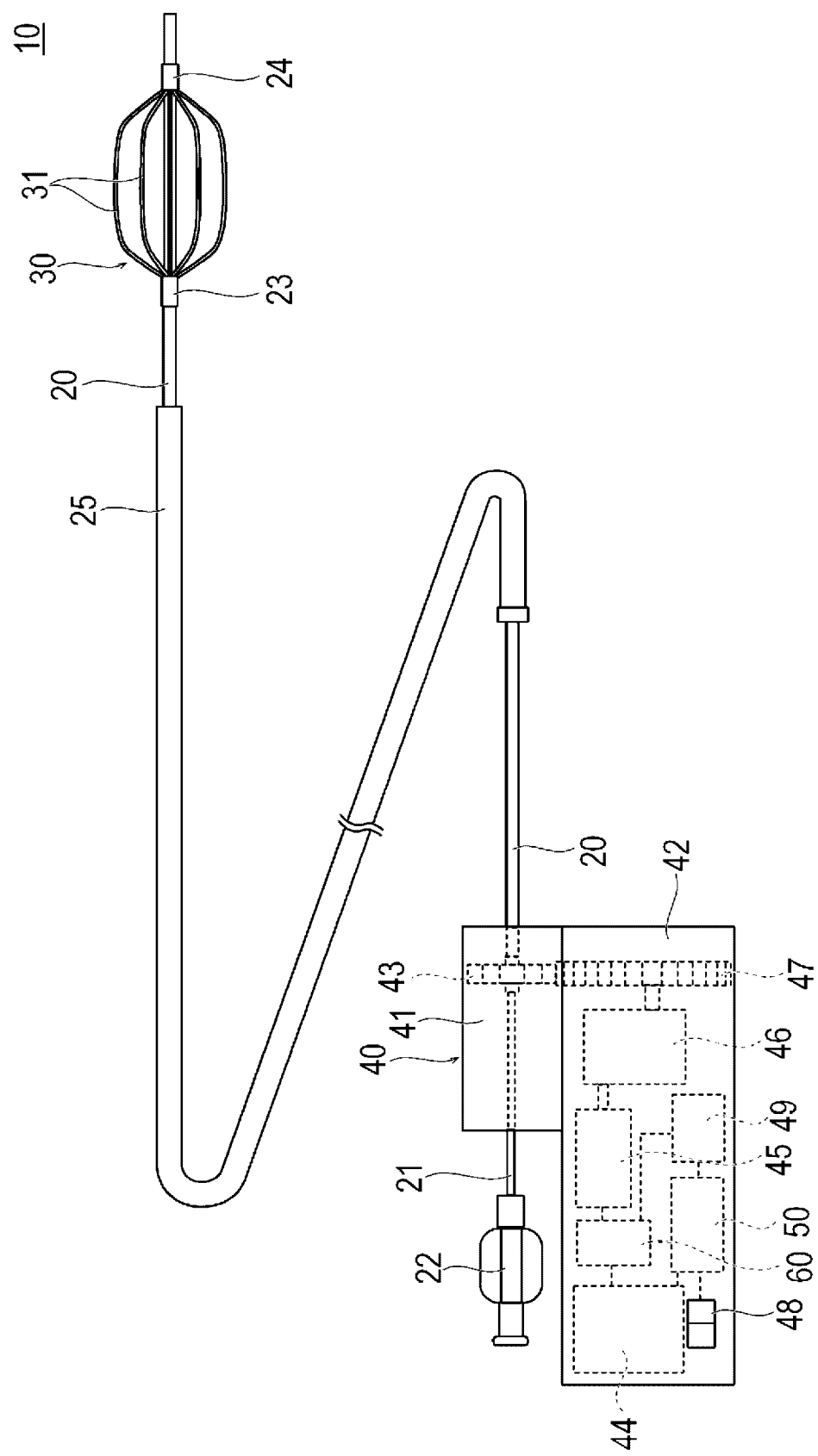
FIG. 1 is a plan view showing a medical device according to an embodiment.

Hereinafter, embodiments of the present disclosure will be described with reference to the drawings. Note that a size and a ratio of each member in the drawings may be exaggerated for convenience of description and may differ from the actual size and ratio. In the present description, a side of a device to be inserted into a living body is referred to as a "distal side", and a side of the device held by the operator is referred to as a "proximal side".

A medical device 10 according to an embodiment is inserted into a blood vessel and used for a procedure of destroying and removing thrombus. Note that an object to be removed is not necessarily limited to thrombus, and any object which may be present in a biological lumen can be removed by the medical device 10.

Figure 2:
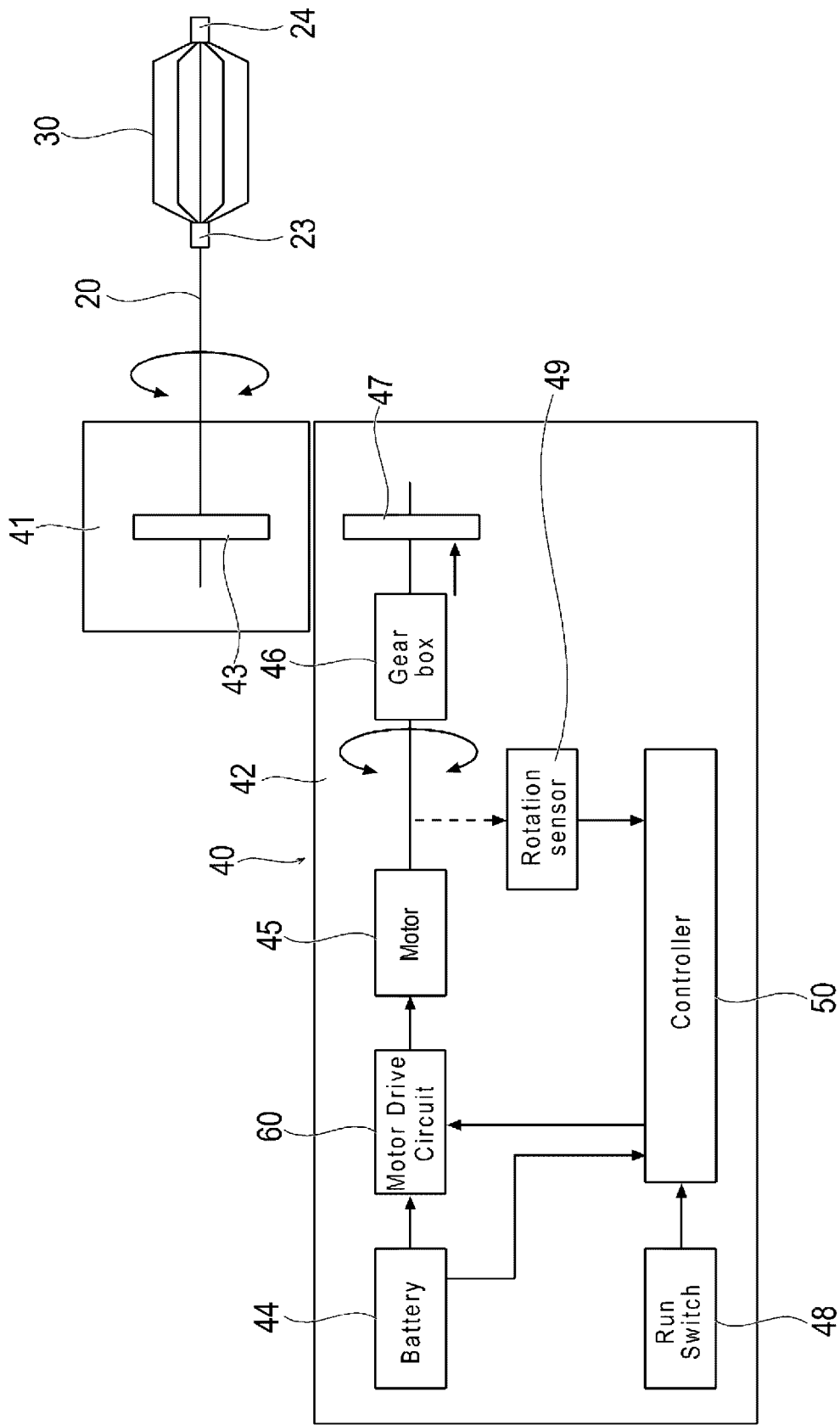
FIG. 2 is a hardware block diagram of the medical device.

As shown in FIGS. 1 and 2, the medical device 10 includes an elongated shaft portion 20 which is rotationally driven, a pipe body 21 for guide wire into which a guide wire 100 (see FIGS. 6A and 6B) can be inserted, an outer sheath 25 capable of accommodating the shaft portion 20, a rotatable structure 30 which is rotated by the shaft portion 20, and an operation unit 40 which is disposed at a proximal portion of the shaft portion 20.

A proximal end portion of the shaft portion 20 is disposed in the operation unit 40. The shaft portion 20 can reciprocate along a circumferential direction by the operation unit 40. The shaft portion 20 is not limited to one which reciprocates, and may be one which rotates in one direction.

Figure 5:
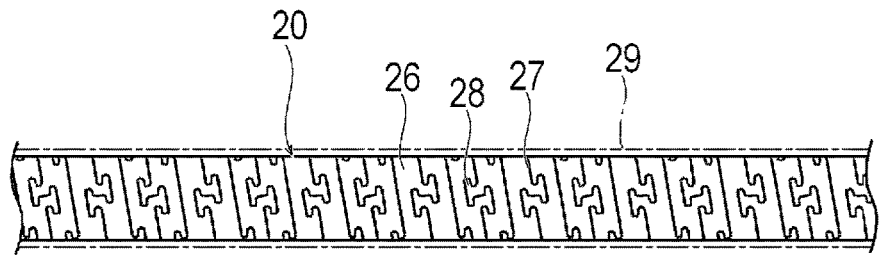
FIG. 5 is a plan view of a shaft portion.

The shaft portion 20 preferably has a structure which reduces torsion. As an example, as shown in FIG. 5, the shaft portion 20 is formed of a metal circular pipe 26 and a resin cover tube 29 covering the outside of the circular pipe 26. The circular pipe 26 is formed of, for example, a metal material such as stainless steel or a Ni—Ti-based alloy so as to have high torque transmission performance, and has spiral slits 27 so as to be flexibly bendable. A plurality of hook structures 28 are formed in the slits 27 such that the hook structures 28 are hooked to prevent a slit width from widening, so that the circular pipe 26 has high strength against torsion in a direction in which the slit width widens. The cover tube 29 covers the outside of the circular pipe 26 with a small clearance to limit deformation of the circular pipe 26 in the radial direction. Therefore, the cover tube 29 can appropriately maintain a shape of the slits 27 so that the circular pipe 26 can exhibit high torque transmission performance and flexibility. Note that a configuration of the shaft portion 20 is not limited thereto. For example, the shaft portion 20 may have a structure in which two or more types of coils having different winding directions are stacked in the radial direction and disposed in layers.

The pipe body 21 for guide wire is disposed inside a hollow of the shaft portion 20, and a hub 22 is interlocked to a proximal end thereof. The pipe body 21 for guide wire has a guide wire lumen into which the guide wire 100 can be inserted.

The outer sheath 25 is coaxially disposed outside the shaft portion 20. A lumen of the outer sheath 25 can house the deflated rotatable structure 30. For example, a Y connector may be connected to a proximal portion of the outer sheath 25. Accordingly, a suction force can be applied from a side branch of the Y connector to the outer sheath 25, and a thrombolytic agent can be injected.

The rotatable structure 30 is interlocked to a distal portion of the shaft portion 20. The rotatable structure 30 includes a plurality of wires 31. Both ends of the wires 31 in the axial direction are interlocked to the shaft portion 20, and central portions of the wires 31 protrude away from the shaft portion 20 in the radial direction. Note that a shape of each of the wires 31 is not particularly limited, and may be formed in a spiral shape, for example. The number of the wires 31 is not particularly limited. A proximal end portion of the wire 31 is fixed to a slide portion 23 which is slidable with respect to the shaft portion 20. A distal end portion of the wire 31 is fixed to a fixing portion 24 fixed with respect to the shaft portion 20. The fixing portion 24 is disposed at the distal side relative to the slide portion 23. Fixing positions of the wires 31 with respect to the fixing portion 24 and the slide portion 23 are aligned in the circumferential direction. Substantially central portions of the curved wires 31 in the axial direction are aligned in the circumferential direction at positions away from the shaft portion 20 in the radial direction. Accordingly, the rotatable structure 30 has a uniform bulge in the circumferential direction as a whole. When the shaft portion 20 rotates, the rotatable structure 30 also rotates in accordance with the rotation of the shaft portion 20, thrombus in the blood vessel can be broken or the broken thrombus can be stirred.

Each wire 31 constituting the rotatable structure 30 is formed of a flexible thin metal wire. The rotatable structure 30 is accommodated in the outer sheath until the rotatable structure 30 reaches a target site in the blood vessel. When the wire 31 is accommodated in the outer sheath 25, the outer sheath 25 is moved to the distal side with respect to the shaft portion 20, and a distal end portion of the outer sheath 25 is pressed against a proximal portion of the rotatable structure 30. Accordingly, the slide portion 23 moves toward the proximal side along the shaft portion 20, and the diameter of the rotatable structure 30 is reduced and the wires 31 are accommodated in the outer sheath 25. After the shaft portion 20 is inserted into the blood vessel until the rotatable structure 30 reaches the target site in the blood vessel, when the outer sheath 25 is moved to the proximal side with respect to the shaft portion 20, the rotatable structure 30 is exposed to an outside of the outer sheath 25 and expands by its own elastic force. At this time, the slide portion 23 moves to the distal side along the shaft portion 20.

Note that the fixing portion 24 may be disposed at the proximal side relative to the slide portion 23. In this case, when the wires 31 are accommodated in the outer sheath 25, the outer sheath 25 is moved to the distal side with respect to the shaft portion 20, and the distal end portion of the outer sheath 25 is pressed against the proximal portion of the rotatable structure 30. Accordingly, the slide portion 23 moves toward the distal side along the shaft portion 20, and the diameter of the rotatable structure 30 is reduced and the wires 31 are accommodated in the outer sheath 25. After the shaft portion 20 is inserted to the target site of the blood vessel, when the outer sheath 25 is moved to the proximal side with respect to the shaft portion 20, the rotatable structure 30 is exposed to the outside of the outer sheath 25 and expands by its own elastic force. At this time, the slide portion 23 moves to the proximal side along the shaft portion 20.

Each wire 31 is desirably made of a material having a shape memory so that the wire 31 can be elastically deformed to a large extent. The material for the wire 31 is preferably, for example, a shape memory alloy or stainless steel to which a shape memory effect or superelasticity is given by heat treatment. As the shape memory alloy, Ni—Ti based, Cu—Al—Ni based, Cu—Zn—Al based, or a combination thereof is suitable.

The operation unit 40 includes a connection unit 41 in which the proximal portion of the shaft portion 20 is disposed, and a drive unit 42 which can be connected to the connection unit 41. The connection unit 41 includes a driven gear 43 interlocked to the proximal portion of the shaft portion 20.

The drive unit 42 supplies a drive force to the connection unit 41. The drive unit 42 can be connected to and disconnected from the connection unit 41. The drive unit 42 includes a battery 44, a motor 45 which is connected to a power supply, a motor drive circuit 60 which controls rotation of the motor 45, a drive gear 47 which can mesh with the driven gear, and a gear box 46 which interlocks the motor 45 and the drive gear 47. The drive unit 42 further includes a run switch 48 for starting and stopping driving, a rotation sensor 49 for detecting the rotational speed of the shaft portion 20 or the motor 45, and a controller 50 for controlling the motor drive circuit 60.

The drive gear 47 meshes with the driven gear 43 by connecting the drive unit 42 to the connection unit 41. The drive gear 47 is rotationally driven by the motor 45 to rotate the driven gear 43. When the driven gear 43 rotates, the proximal portion of the shaft portion 20 rotates, and the rotatable structure 30 interlocked to the distal portion of the shaft portion 20 can be rotated.

The gear box 46 interlocks a rotation shaft of the motor 45 and the drive gear 47 at a predetermined gear ratio. The power supply is the battery 44 disposed in the drive unit 42, but may be an external power supply. The run switch 48 is used by an operator to start and stop driving the medical device 10. When the run switch 48 is turned on, the operation of the medical device 10 is started, and when the run switch 48 is turned off, the operation of the medical device 10 is stopped.

The motor 45 is a DC motor which is rotated by a direct current. Since the motor 45 is a DC motor, short-circuiting terminals can generate short braking. Note that a configuration in which terminals of the motor 45 are short-circuited is not limited to a configuration in which the terminals are directly connected, and may be a configuration in which a resistor, a capacitor, or the like is interposed therebetween in order to limit a current flowing for the purpose of circuit protection or the like.

The rotation sensor 49 detects the rotational speed (e.g., the number of rotations per minute) of the shaft portion 20 or the motor 45. The rotation sensor 49 is, for example, an ammeter for detecting a current flowing through the motor 45. The rotation sensor 49 optically, magnetically, or electrically detects rotation of a shaft, but a detection method is not particularly limited. When the rotation sensor 49 is an ammeter, a position where the rotation sensor 49 is disposed is not particularly limited as long as a current flowing through the motor 45 can be detected, and the rotation sensor 49 is connected in series to any terminal of the motor 45. Note that the rotational speed of the shaft portion 20 can be calculated from the rotational speed of the motor 45.

The controller 50 controls the motor drive circuit 60. The controller 50 is, for example, a microcontroller, but a configuration of the controller 50 is not limited as long as the controller 50 can execute control. For example, the controller 50 may include a central processing unit (CPU) and a memory circuit, or a dedicated circuit, such as a combination of flip-flop circuits, CPLD, or the like, including a logic circuit for responding to a rotation state or an operation of a user. The memory circuit stores a program executed by the controller 50 and various parameters.

The controller 50 is driven by a current from the battery 44, and starts its operation by the run switch 48 and controls a current supplied to the motor 45 by the motor drive circuit 60 so that the rotatable structure 30 is rotated at a preset rotational speed. The controller 50 receives a signal indicating the rotational speed of the motor 45 from the rotation sensor 49. Note that the controller 50 may receive a signal from the motor 45 indicating the rotational speed of the motor 45 and convert the signal into a rotational speed of the shaft portion 20.

The motor drive circuit 60 includes a drive current generation circuit 70 which generates a current for driving the motor 45, an emergency braking circuit 80 for emergency braking the motor 45, and a protection circuit 90.

Figure 3:
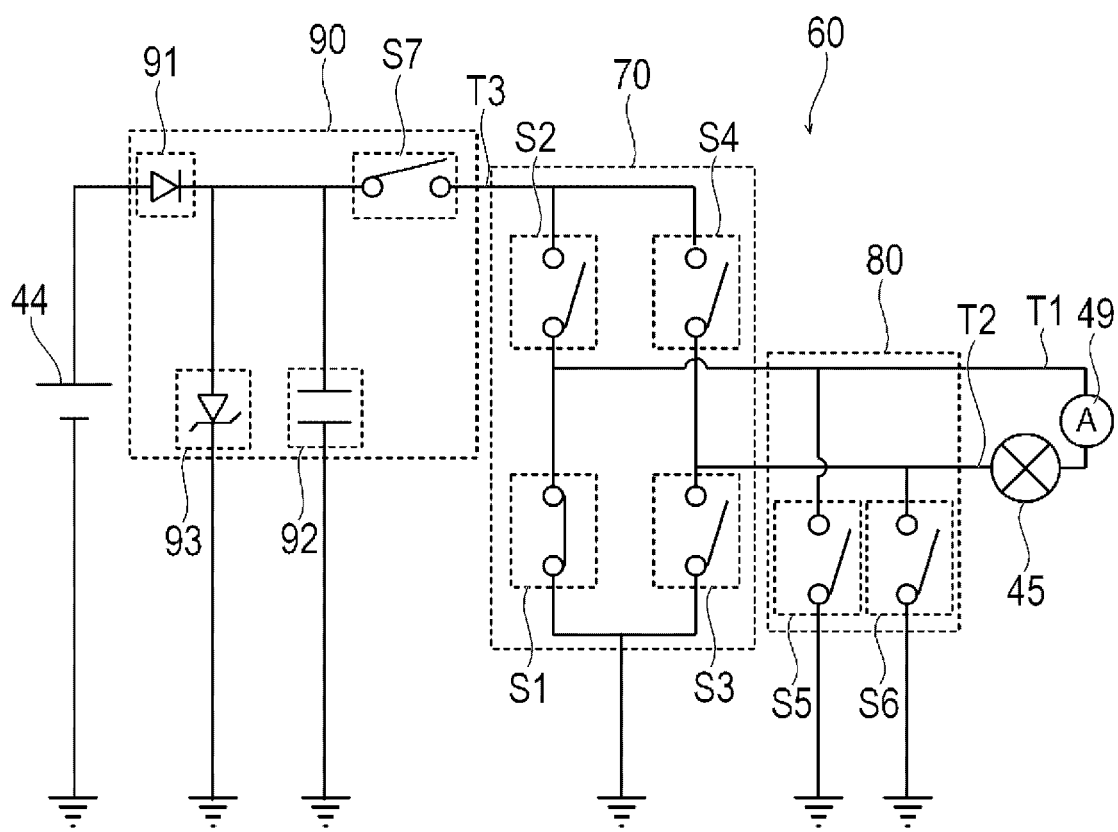
FIG. 3 is a circuit diagram of a motor drive circuit.

As shown in FIG. 3, the drive current generation circuit 70 includes an H-bridge circuit. The drive current generation circuit 70 includes a first switch S1 and a second switch S2 connected in series, and a third switch S3 and a fourth switch S4 connected in series. Each of the first switch S1, the second switch S2, the third switch S3, and the fourth switch S4 is a switching element capable of switching on and off a current flow.

One terminal of the first switch S1 is grounded, and the other terminal is connected to the second switch S2. One terminal of the second switch S2 is connected to the battery 44, and the other terminal is connected to the first switch S1. One terminal of the third switch S3 is grounded, and the other terminal is connected to the fourth switch S4. One terminal of the fourth switch S4 is connected to the battery 44, and the other terminal is connected to the third switch S3. A first terminal T1 of the motor 45 is connected between the first switch S1 and the second switch S2, and a second terminal T2 of the motor 45 is connected between the third switch S3 and the fourth switch S4.

As shown in FIG. 4A, the drive current generation circuit 70 of the motor drive circuit 60 is controlled by the controller 50 such that the second switch S2 and the third switch S3 are switched on and the first switch S1 and the fourth switch S4 are switched off, so that a current from the battery 44 can flow from the second switch S2 via the motor 45 to the third switch S3. At this time, a current flows from the first terminal T1 to the second terminal T2 of the motor 45, and the shaft portion 20 performs clockwise (CW) rotation.

As shown in FIG. 4B, the drive current generation circuit 70 is controlled by the controller 50 such that the first switch S1 and the fourth switch S4 are switched on and the second switch S2 and the third switch S3 are switched off, so that a current from the battery 44 can flow from the fourth switch S4 via the motor 45 to the first switch S1. At this time, a current flows from the second terminal T2 to the first terminal T1 of the motor 45, and the shaft portion 20 performs counterclockwise (CCW) rotation.

As shown in FIG. 4C, the drive current generation circuit 70 is controlled by the controller 50 such that all of the first switch S1, the second switch S2, the third switch S3, and the fourth switch S4 are switched off, so that the first terminal T1 and the second terminal T2 of the motor 45 are open.

As shown in FIG. 4D, the drive current generation circuit 70 is controlled by the controller 50 such that the first switch S1 and the third switch S3 are switched on and the second switch S2 and the fourth switch S4 are switched off, so that the first terminal T1 and the second terminal T2 of the motor 45 are short-circuited.

As shown in FIG. 3, the emergency braking circuit 80 is controlled by the controller 50, for example, when an excessive torque load is detected, and performs emergency braking of the motor 45. The emergency braking circuit 80 includes a fifth switch S5 and a sixth switch S6. One terminal of the fifth switch S5 is grounded, and the other terminal is connected to the first terminal T1 of the motor 45. One terminal of the sixth switch S6 is grounded, and the other terminal is connected to the second terminal T2 of the motor 45. Each of the fifth switch S5 and the sixth switch S6 is a switching element capable of switching on and off a current flow. In the emergency braking circuit 80, the fifth switch S5 and the sixth switch S6 are switched off by the controller 50 during a normal operation in which emergency braking is not performed. The emergency braking circuit 80 generates short-circuit braking by switching the fifth switch S5 and the sixth switch S6 on by the controller 50 and short-circuiting the first terminal T1 and the second terminal T2, when emergency braking is performed.

The protection circuit 90 protects the motor drive circuit 60 from a back electromotive force of the motor 45. The protection circuit 90 includes a diode 91, a capacitor 92, a Zener diode 93, and a seventh switch S7. An anode of the diode 91 is connected to an input from the battery 44, and a cathode is connected via the seventh switch S7 to an input terminal T3 of the drive current generation circuit 70 (i.e., the second switch S2 and the fourth switch S4). One terminal of the capacitor 92 is connected via the seventh switch S7 to the input terminal T3 of the drive current generation circuit 70, and the other terminal is grounded. One terminal of the Zener diode 93 is connected via the seventh switch S7 to the input terminal T3 of the drive current generation circuit 70, and the other terminal is grounded. One terminal of the seventh switch S7 is connected to the cathode of the diode 91, the capacitor 92, and the Zener diode 93, and the other terminal is connected to the input terminal T3 of the drive current generation circuit 70. The seventh switch S7 is a switching element capable of switching on and off a current flow. The diode 91, the capacitor 92, and the Zener diode 93 are not limited thereto, and may be circuits having similar functions.

Note that the connection unit 41 and the drive unit 42 may be integrally formed.

Figure 7:
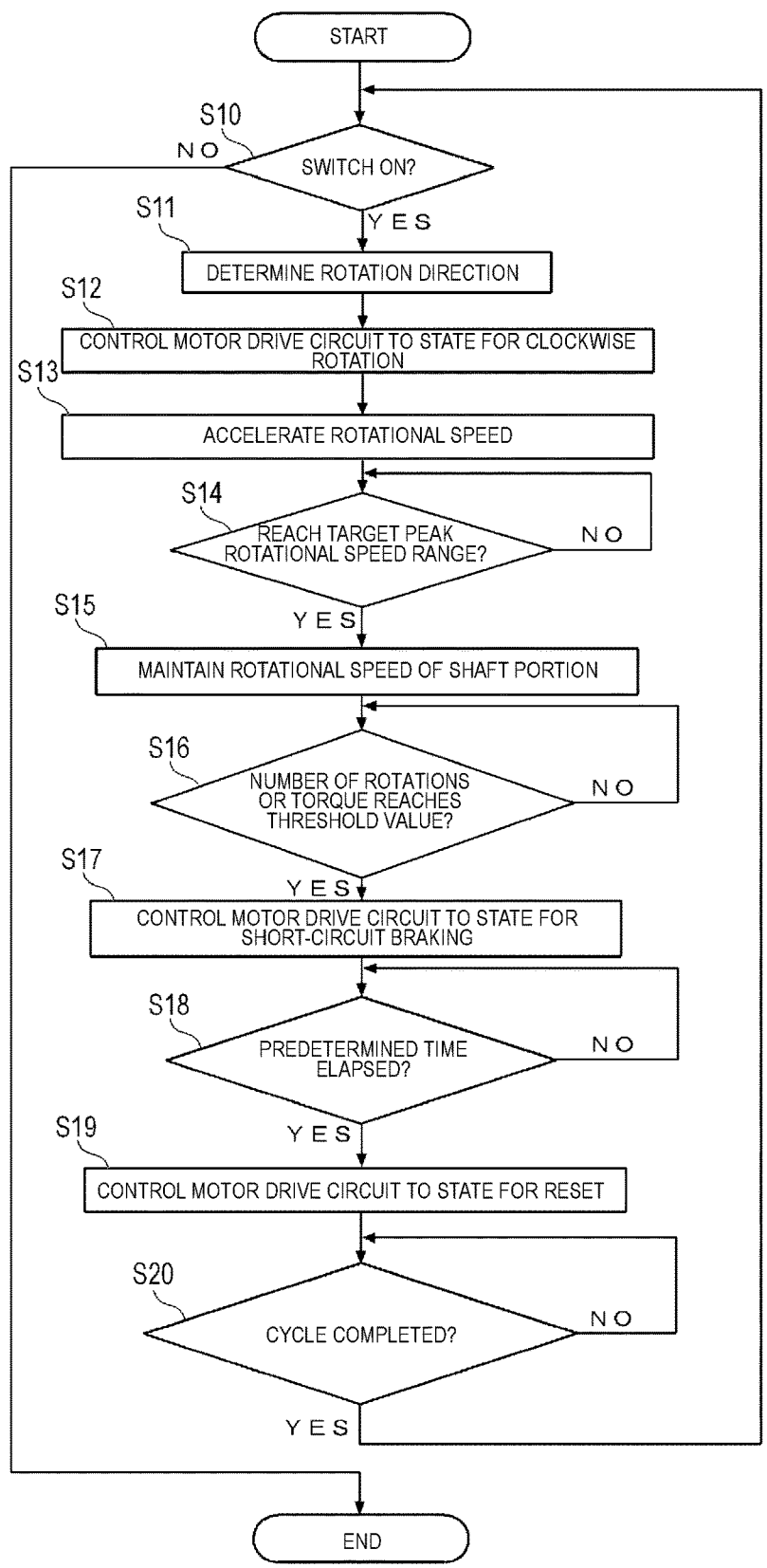
FIG. 7 is a flowchart of a rotation control method performed by the medical device.

Next, a rotation control method for the medical device 10 according to an embodiment will be described with reference to a flowchart shown in FIG. 7, using an example in which thrombus B in a blood vessel is destroyed and aspirated.

Figure 6A:
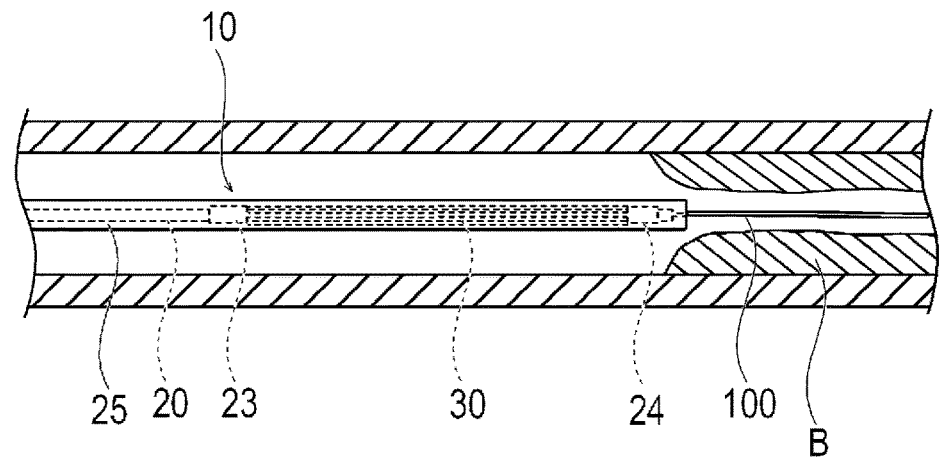
FIG. 6A is a cross-sectional view of the medical device inserted into a blood vessel.
Figure 6B:
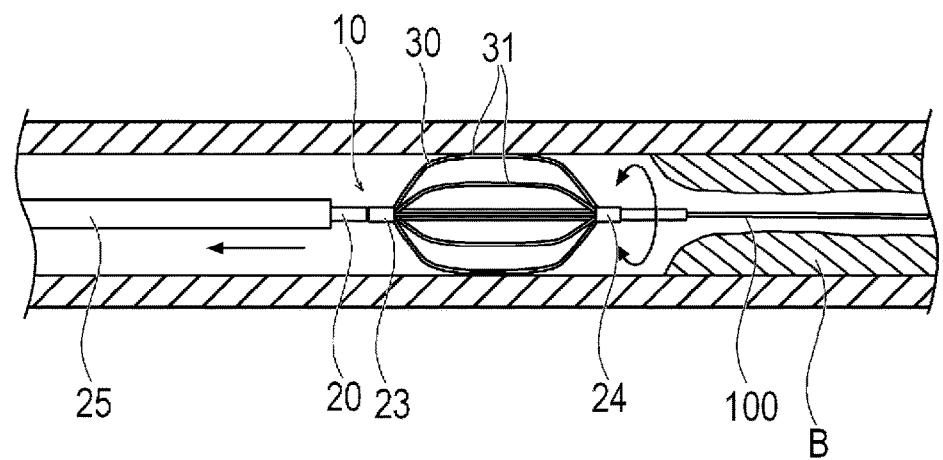
FIG. 6B is a cross-sectional view of the medical device, a rotatable structure of which is expanded inside the blood vessel.

First, the medical device 10 in a state in which the distal portion of the shaft portion 20 including the rotatable structure 30 is accommodated in the outer sheath 25 is prepared. Next, a proximal end of the guide wire 100, which is positioned outside a body, is inserted into the guide wire lumen of the pipe body 21 for guide wire of the medical device 10. Subsequently, as shown in FIG. 6A, the medical device 10 is moved to reach a vicinity of the thrombus B along the guide wire 100 inside the blood vessel. Thereafter, when the outer sheath 25 is moved toward the proximal side with respect to the shaft portion 20, as shown in FIG. 6B, the rotatable structure 30 is exposed to the outside of the outer sheath 25 and expands by its own elastic force. At this time, the slide portion 23 moves to the distal side with respect to the shaft portion 20.

Figure 8:
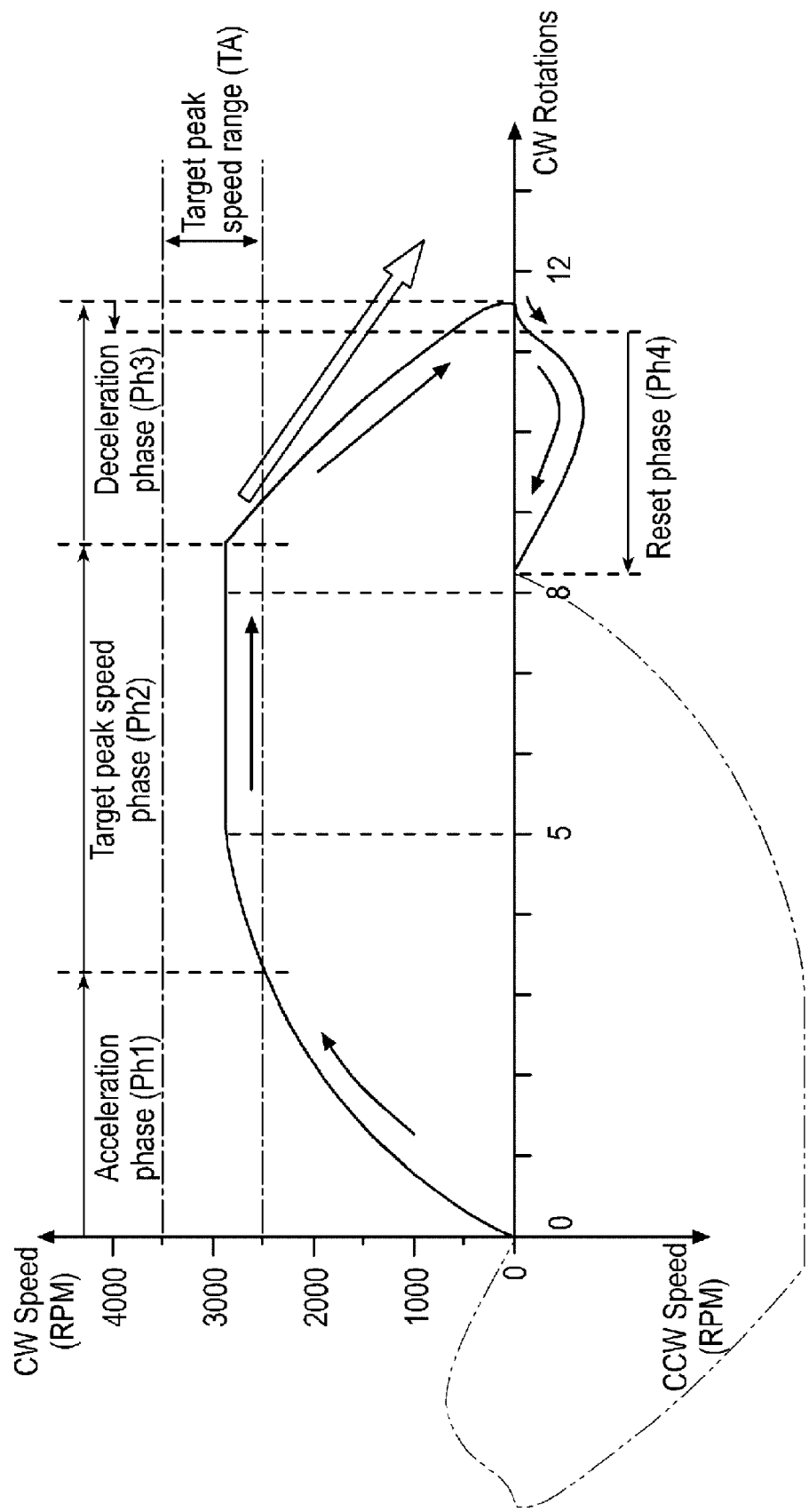
FIG. 8 is a graph showing a rotational speed with respect to the number of rotations of the medical device.

Next, an operator operates the run switch 48 shown in FIGS. 1 and 2 to operate the medical device 10 (step S10). Accordingly, the controller 50 determines a rotation direction of the motor 45 (step S11), and controls the motor drive circuit 60 to transition to the state for clockwise rotation shown in FIG. 4A (step S12). During a normal operation in which emergency braking is not performed, the controller 50 switches off the fifth switch S5 and the sixth switch S6 of the emergency braking circuit and switches on the seventh switch S7 of the protection circuit 90. Accordingly, the motor 45 starts rotating, and a rotational force is transmitted to the shaft portion 20 via the gear box 46, the drive gear 47, and the driven gear 43. Accordingly, the shaft portion 20 and the rotatable structure 30 start to rotate. Note that the direction in which the shaft portion 20 is first rotated is the clockwise CW here, but the rotation direction may be reversed. As shown in FIG. 8, the controller 50 gradually accelerates the shaft portion 20 and the rotatable structure 30 driven by the motor 45 (step S13). This phase of the medical device 10 is referred to as an acceleration phase Ph1.

The controller 50 receives a signal from the rotation sensor 49 and monitors the rotational speed of the shaft portion 20. When the rotational speed of the shaft portion 20 reaches a target peak speed range TA (step S14), the controller 50 maintains the rotational speed of the shaft portion 20 (step S15). The target peak speed range TA is not particularly limited, but is 2500 rpm to 3500 rpm in the present example. The controller 50 controls a current input to the motor 45 so as to maintain the target peak speed range TA. This phase of the medical device 10 is defined as a target peak speed phase Ph2. Since the rotatable structure 30 having reached the target peak speed range TA has a high speed, the thrombus B adhering to the blood vessel and the thrombus B floating in the blood vessel can be effectively broken. Therefore, it is preferable that there is a time during which the rotatable structure 30 rotates in the target peak speed range TA. Note that there may be no time for the rotatable structure to rotate in the target peak speed range TA when not reaching the target peak speed range TA.

When the rotatable structure 30 rotates in the blood vessel, the rotatable structure 30 breaks the thrombus B. Blood and the broken thrombus B in the blood vessel rotate by receiving a force from the rotatable structure 30. Therefore, a rotational speed of the blood and the thrombus B in the blood vessel increases with a delay from the rotational speed of the rotatable structure 30.

When the rotational speed of the rotatable structure 30 becomes substantially constant in the target peak speed range TA, the blood and the broken thrombus B rotating by receiving the force from the rotatable structure 30 gradually approach the rotational speed of the rotatable structure 30 and substantially match the rotational speed of the rotatable structure 30. That is, the controller 50 maintains the rotational speed of the rotatable structure 30 constant until the rotational speed of the blood and the broken thrombus B substantially matches the rotational speed of the rotatable structure 30. When the rotational speed of the blood and the broken thrombus B reaches the rotational speed of the rotatable structure 30, a relative speed between the rotatable structure 30 and the blood and the broken thrombus B increases when the rotatable structure 30 rotates in a reverse direction thereafter. Therefore, the rotatable structure 30 can effectively break the thrombus B.

When the rotational speed of the rotatable structure 30 substantially matches the rotational speed of the thrombus B, the thrombus B rotates together with the rotatable structure 30. Therefore, the rotatable structure 30 cannot break the thrombus B floating in the blood vessel. Therefore, it is preferable to immediately stop the rotation of the rotatable structure 30 after the rotational speed of the rotatable structure 30 substantially matches the rotational speed of the thrombus B.

When the total number of rotations reaches a predetermined number of times or a torque load exceeds a threshold value (step S16), the controller 50 controls the motor drive circuit 60 to transition to the state for short-circuit braking shown in FIG. 4D (step S17). Note that the number of rotations may not be an integer. The controller 50 can calculate the torque load based on an output of an ammeter. Accordingly, the first terminal T1 and the second terminal T2 of the motor 45 are short-circuited, and short braking occurs. Accordingly, a current in the circuit applied to the motor 45 flows backward. Here, the expression "flow backward" means that a current flows in a reverse direction to the flow of the current applied to the motor 45 at a phase before braking is started (for example, the target peak speed phase Ph2). Therefore, kinetic energy of the motor 45 is converted into thermal energy, and the motor 45 and the shaft portion 20 decelerate. This phase of the medical device 10 is a deceleration phase Ph3 as shown in FIG. 8. The motor 45 and the shaft portion 20 are decelerated faster by the short-circuit braking of the motor 45 than in a case where the motor 45 freely rotates. Note that the free rotation of the shaft portion 20 is indicated by a white arrow in FIG. 8.

The controller 50 continues the short-circuit braking until the clockwise CW rotation of the motor 45 and the proximal portion of the shaft portion 20 becomes completely zero, and is reversed to the counterclockwise CCW rotation. The controller 50 continues the short-circuit braking until a preset predetermined time has elapsed since the deceleration phase Ph3. When the preset predetermined time has elapsed from the deceleration phase Ph3 (step S18), the controller 50 controls the motor drive circuit 60 to transition to the idle state shown in FIG. 4C (step S19). Accordingly, the motor 45 and the shaft portion 20 that have started to perform the counterclockwise CCW rotation can be idled without being forcibly braked to prepare for a next rotating operation. This phase of the medical device 10 is a reset phase Ph4 as shown in FIG. 8. A predetermined time from the deceleration phase Ph3 to release of the short-circuit braking is set based on results of experiments and simulations so that rotational energy accumulated in the motor 45 and strain energy of torsion accumulated in the shaft portion 20 are sufficiently reduced. Note that when a predetermined time has elapsed from the deceleration phase Ph3, rotation of the motor 45 and the shaft portion 20 may not be reversed.

Note that the controller 50 may not release the short-circuit braking to bring the motor drive circuit 60 into the idle state when a preset predetermined time has elapsed since the deceleration phase Ph3. For example, the controller 50 may monitor a signal from the ammeter and release the short-circuit braking after it is detected that clockwise CW rotation of the motor 45 and the shaft portion 20 becomes completely zero and counterclockwise CCW rotation occurs.

In addition, the controller 50 may monitor a signal from the ammeter and release the short-circuit braking when it is detected that a current value becomes equal to or less than a predetermined value before becoming zero (i.e., before the rotation is reversed).

In addition, the controller 50 may monitor a signal from the ammeter and release the short-circuit braking when it is detected that a current value reaches a predetermined value after becoming zero (i.e., after the rotation is reversed).

Figure 9:
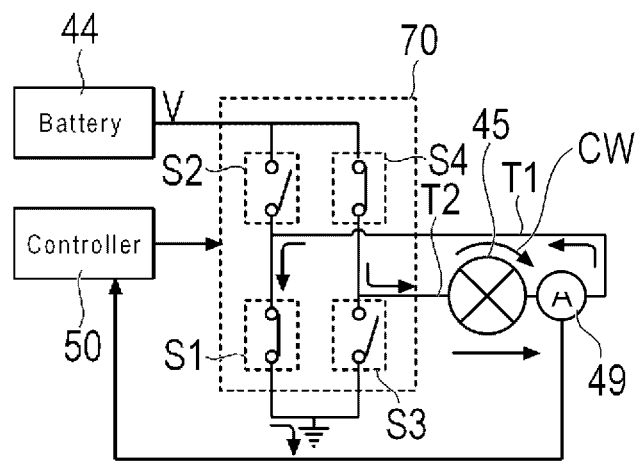
FIG. 9 is a circuit diagram of the drive current generation circuit that applies a counterclockwise rotational force to a motor while the motor is rotating clockwise.

In a state where the motor 45 continues the clockwise CW rotation while decelerating in the deceleration phase Ph3, the controller 50 may control the circuit of the motor drive circuit 60 to transition to the state shown in FIG. 9 instead of the state for short-circuit braking shown in FIG. 4D. Accordingly, a current which generates a counterclockwise CCW rotational force acts on the motor 45 which continues the clockwise CW rotation. Therefore, a strong braking force can be applied to the motor to rapidly decelerate the motor 45. In the deceleration phase Ph3, the controller 50 may perform both the above short-circuit braking (see FIG. 4D) and the above braking (see FIG. 9) in which a rotational force in a reverse direction to the rotation direction of the motor 45 is applied to the motor 45 at different timings (for example, alternately). Braking for applying the rotational force to the motor 45 in the reverse direction to the rotation direction of the motor 45 is not limited to being performed by the drive current generation circuit 70, and may be performed by a circuit other than the drive current generation circuit 70 of the motor drive circuit 60. The controller 50 may cause a current in the circuit applied to the motor 45 to flow backward in order to eliminate torsion of the shaft portion 20 and the rotatable structure 30 in a state where the motor is stopped.

Since no current is supplied to the motor 45 in the reset phase Ph4, the motor 45 freely rotates together with the shaft portion 20, gradually decelerates, and stops. Note that the reset phase Ph4 may not be provided. That is, the deceleration phase Ph3 in which short-circuit braking is performed may be continued until the motor and the shaft portion 20 stop.

After the motor 45 and the shaft portion 20 are stopped, the controller performs a counterclockwise (CCW) rotation operation as indicated by a two-dot chain line in FIG. 8. The controller 50 can perform a similar operation as the clockwise CW rotation operation above by reversing the rotation direction.

A rotation phase of the rotatable structure 30 positioned at the distal portion of the shaft portion 20 is delayed with respect to the rotation of the motor 45 due to torsion of the shaft portion 20. Therefore, it takes a predetermined time until the rotation of the rotatable structure 30 stops after the rotation of the motor 45 stops. Therefore, by providing the deceleration phase Ph3 and the reset phase Ph4 in the operation by the controller 50, the torsion of the shaft portion 20 can be quickly returned, and the rotatable structure 30 can be quickly recovered to a state desirable for breaking.

Note that the next rotational operation may be started before the rotation of the motor 45 and the proximal portion of the shaft portion 20 becomes completely zero.

When the controller 50 determines that the rotational speed of the motor becomes zero or approaches zero based on a detection result of the rotation sensor 49, the reset phase Ph4 is ended (step S20). Note that the controller 50 may determine that the reset phase Ph4 is ended not based on the detection result of the rotation sensor 49, but when an elapsed time from a predetermined phase reaches a preset time. An end of the reset phase Ph4 may be an elapsed time from a start of the acceleration phase Ph1, an elapsed time from a start of the target peak speed phase Ph2, an elapsed time from a start of the deceleration phase Ph3, or an elapsed time from an end of the deceleration phase Ph3.

When the controller 50 determines that the reset phase Ph4 is ended and one rotation cycle (steps S10 to S20) is completed, the controller 50 determines whether the run switch 48 is on or off (step S10), and determines the rotation direction of the motor 45 in the next rotation cycle (step S11) if the on state is maintained. For example, the controller 50 sets the rotation direction of the motor 45 to the direction opposite to the rotation direction of the motor 45 in the previous rotation cycle. The controller 50 controls the motor drive circuit 60 to set the circuit to a state for counterclockwise CCW rotation shown in FIG. 4B. The controller 50 gradually accelerates the shaft portion 20 and the rotatable structure 30 driven by the motor 45 (step S13) so that the rotational speed of the shaft portion 20 and the rotatable structure reaches the target peak speed range TA in which positive and negative are reversed with respect to the case of rotation in the previous rotation cycle. At this time, positive and negative of the current are also reversed with respect to the case of the rotation before stopping. Thereafter, similarly to clockwise CW rotation control above, the controller 50 performs control over the motor drive circuit 60 (steps S14 to S20). As long as the run switch 48 is maintained on, the controller 50 repeats steps S10 to S20 while switching the rotation direction of the motor 45. When the operator turns off the run switch 48, the controller 50 maintains the rotation of the motor 45 in a stopped state and ends the control (step S10). After an operation of the medical device 10 is stopped, the operator causes the rotatable structure 30 to be accommodated in the outer sheath 25 and removes the medical device 10 from the blood vessel.

Figure 10:
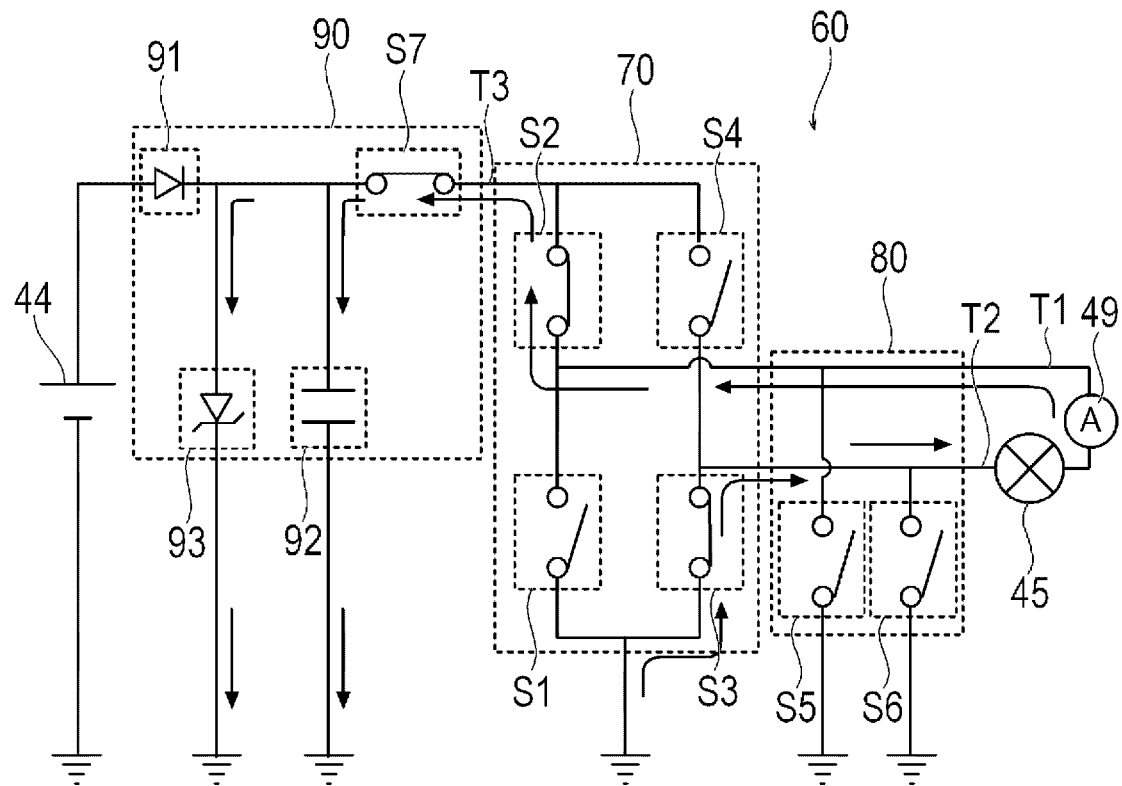
FIG. 10 is a circuit diagram of a protection circuit of the motor drive circuit.

When an excessive back electromotive force is generated in the motor in a state where the motor 45 is not cut off from the battery 44, that is, in a state where a current can be supplied from the battery 44 to the motor 45, a current in a reverse direction due to the back electromotive force is stored in the capacitor 92 without passing through the diode 91 as shown in FIG. 10, and after a voltage of the protection circuit 90 exceeds a breakdown voltage, a current in the reverse direction flows to the Zener diode 93. Accordingly, the motor drive circuit 60 can be protected from an excessive back electromotive force.

Figure 11:
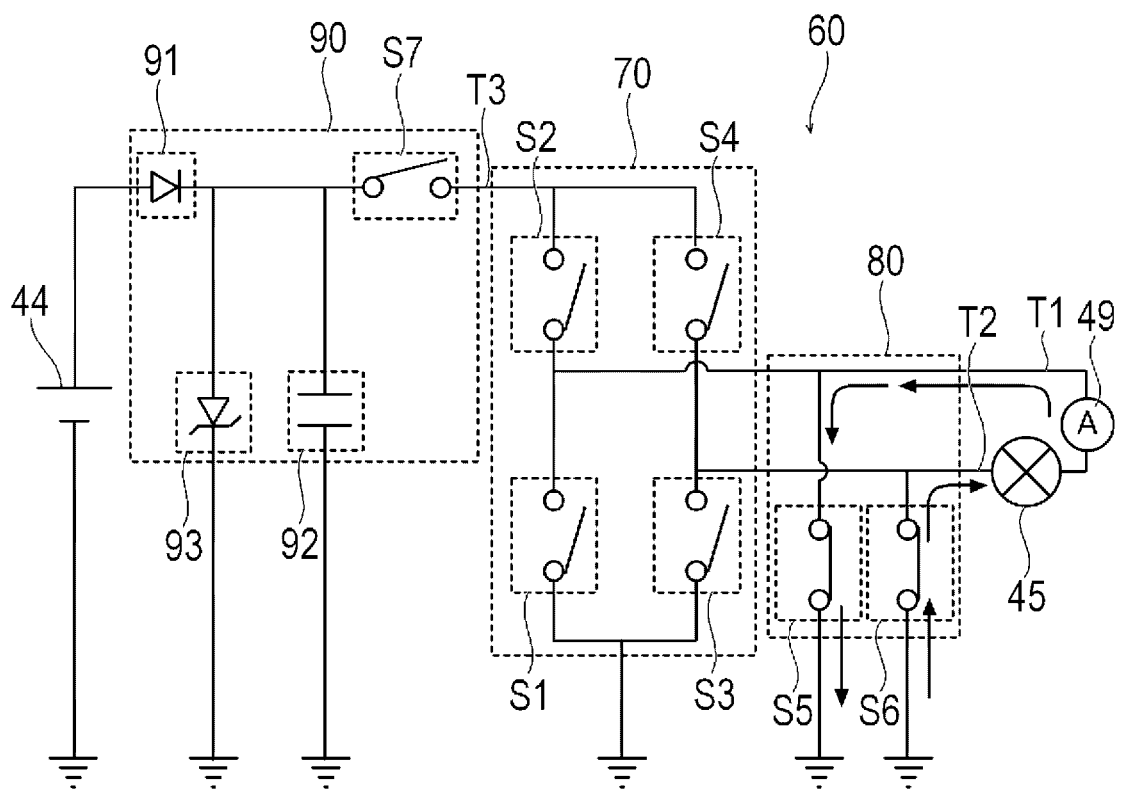
FIG. 11 is a circuit diagram of an emergency braking circuit of the motor drive circuit.

During a normal operation in which emergency braking is not performed, the controller 50 switches off the fifth switch S5 and the sixth switch S6 of the emergency braking circuit 80 and switches on the seventh switch S7 of the protection circuit 90. The controller 50 can perform emergency braking of the motor 45, for example, in a case where an excessive torque load exceeding a threshold value is detected by an ammeter or an excessive change in the number of times of rotations exceeding a threshold value is detected by the rotation sensor 49. When the controller determines that emergency braking is to be performed, as shown in FIG. 11, the controller 50 can switch on the fifth switch S5 and the sixth switch S6 of the emergency braking circuit 80, switch off the first switch S1, the second switch S2, the third switch S3, and the fourth switch S4 of the drive current generation circuit 70, and switch off the seventh switch of the protection circuit 90. Accordingly, the first terminal T1 and the second terminal T2 of the motor 45 are short-circuited via the ground, and short braking occurs. Accordingly, a current which generates a rotational force in the direction opposite to the rotation direction of the motor 45 flows. Therefore, a braking force can be applied to the motor 45 to decelerate the motor 45 and the shaft portion 20.

As described above, the elongated medical device 10 can be inserted into a biological lumen. The medical device 10 includes: the elongated shaft portion 20 which is rotationally driven; the motor 45 configured to rotate the proximal portion of the shaft portion 20; the power supply (for example, the battery 44) configured to supply a current to the motor 45; the rotatable structure 30 interlocked to the distal portion of the shaft portion 20 and rotatable; the motor drive circuit 60 configured to drive the motor 45; and the controller 50 configured to control the motor drive circuit to cause the motor drive circuit 60 to drive the motor 45. The motor drive circuit can switch a circuit, and the controller 50 can reverse a direction of a rotational force acting on the motor 45 by switching the circuit of the motor drive circuit 60.

The medical device 10 configured as described above can generate a braking force on the motor 45 by reversing the direction of the rotational force acting on the motor 45. Accordingly, the shaft portion 20 and the rotatable structure 30 can be quickly decelerated. An excessive force such as torsion applied to the shaft portion or the rotatable structure 30 can be eliminated. Therefore, it is possible to effectively prevent damage to the shaft portion 20 or the biological tissue due to strong contact of the shaft portion 20 and the rotatable structure 30 with the biological tissue by rotational energy accumulated in the motor 45 and strain energy of torsion accumulated in the shaft portion 20.

The controller 50 can determine necessity of emergency braking of the motor 45, and when the controller 50 determines that emergency braking is necessary, the controller 50 may reverse the direction of the rotational force acting on the motor by controlling the motor drive circuit 60 to switch from a state in which the motor is connected to the power supply (for example, the battery 44) to a state in which the motor 45 is cut off from the power supply. Accordingly, the medical device 10 can quickly decelerate the motor 45, the shaft portion 20, and the rotatable structure 30 by applying a strong braking force to the motor 45. Since the motor 45 is cut off from the power supply in a state where emergency braking is necessary, the motor 45 is not rotationally driven by a current from the power supply, and thus safety is improved.

The controller 50 can determine necessity of emergency braking of the motor 45, and when the controller 50 determines that emergency braking is not necessary, the controller 50 may control the motor drive circuit 60 to switch from a state in which the motor 45 is connected to the power supply (for example, the battery 44) to a state in which the motor 45 is cut off from the power supply, or may reverse the direction of the rotational force acting on the motor 45 without switching from the state in which the motor 45 is connected to the power supply. Accordingly, the medical device 10 can quickly decelerate the motor 45, the shaft portion 20, and the rotatable structure 30 by applying a strong braking force to the motor 45.

When controlling the motor drive circuit 60 to switch from a state in which the motor 45 is connected to the power supply to a state in which the motor 45 is cut off from the power supply, the controller 50 reverses the direction of the rotational force acting on the motor 45 by a back or induced electromotive force generated in the motor 45. Accordingly, the medical device 10 can quickly decelerate the motor 45, the shaft portion 20, and the rotatable structure 30 by applying a strong braking force to the motor 45.

The controller 50 stops generating the reverse rotational force acting on the motor 45 after a preset predetermined time has elapsed since the direction of the rotational force is reversed by controlling the motor drive circuit 60. Accordingly, control of the controller 50 over a current in the circuit can be simplified, and a stable operation can be performed by shortening a calculation time of the control.

The medical device 10 includes the rotation sensor 49 configured to detect rotation of the motor 45 or the shaft portion 20, and the controller 50 receives an output signal from the rotation sensor 49. Accordingly, the controller 50 can accurately detect an operation state of the shaft portion 20 performed by the motor 45 and accurately control the motor drive circuit 60.

After the direction of the rotational force acting on the motor 45 is reversed by controlling the motor drive circuit 60, the controller 50 may stop generating the reverse rotational force after the reverse rotation of the motor 45 is detected based on a signal from the rotation sensor 49. Accordingly, since braking can be continued until torsion accumulated in the shaft portion 20 is eliminated, it is possible to repeatedly rotate the rotatable structure 30 by the motor 45 while preventing damage to the shaft portion 20 or the biological tissue.

The controller 50 may stop generating the reverse rotational force after the direction of the rotational force acting on the motor 45 is reversed by controlling the motor drive circuit 60, and then when detecting that the rotational speed of the motor 45 reaches a preset threshold value based on a signal from the rotation sensor 49. Accordingly, since braking can be continued until torsion accumulated in the shaft portion 20 is substantially eliminated, it is possible to repeatedly rotate the rotatable structure 30 by the motor 45 while preventing damage to the shaft portion 20 or the biological tissue.

The shaft portion 20 has a structure which reduces torsion. Accordingly, a braking force caused by a short circuit between the terminals of the motor 45 during deceleration of the motor 45 can be effectively applied to the shaft portion 20 which is resistant to torsion, and the rotatable structure 30 interlocked to the distal portion of the shaft portion 20 can be quickly decelerated. Therefore, it is possible to effectively prevent the shaft portion 20 and the rotatable structure 30 from continuing to rotate due to the rotational energy accumulated in the motor 45 and the strain energy of torsion accumulated in the shaft portion 20, and to effectively prevent damage to the shaft portion 20 or the biological tissue.

The rotation control method according to an embodiment is performed by the controller 50 of the medical device 10. The medical device 10 includes the elongated shaft portion 20 which is rotationally driven, the motor 45 configured to rotate the proximal portion of the shaft portion 20, the power supply (for example, the battery 44) configured to supply a current to the motor, the rotatable structure 30 interlocked to the distal portion of the shaft portion 20 and rotatable, the motor drive circuit 60 configured to drive the motor 45, and the controller 50 configured to control the motor drive circuit 60 to cause the motor drive circuit 60 to drive the motor 45. The rotation control method includes: a step of accelerating the motor 45 by controlling the motor drive circuit 60; and a step of reversing a direction of a rotational force acting on the motor 45 by controlling the motor drive circuit 60 to switch from a state in which the motor 45 is connected to the power supply to a state in which the motor 45 is cut off from the power supply. Accordingly, the rotation control method can generate a braking force on the motor 45 by reversing the direction of the rotational force acting on the motor 45. Accordingly, the motor 45, the shaft portion 20, and the rotatable structure 30 can be quickly decelerated. An excessive force such as torsion applied to the shaft portion 20 or the rotatable structure 30 can be eliminated. Therefore, it is possible to effectively prevent damage to the shaft portion 20 or the biological tissue due to strong contact of the shaft portion 20 and the rotatable structure 30 with the biological tissue by rotational energy accumulated in the motor 45 and strain energy of torsion accumulated in the shaft portion 20.

In the step of reversing a direction of the rotational force acting on the motor 45, necessity of emergency braking of the motor 45 may be determined, and when a determination is made that emergency braking is necessary, the direction of the rotational force acting on the motor 45 may be reversed by controlling the motor drive circuit 60 to switch from a state in which the motor 45 is connected to the power supply to a state in which the motor 45 is cut off from the power supply. Accordingly, in the rotation control method for the medical device 10, the motor 45, the shaft portion 20, and the rotatable structure 30 can be quickly decelerated by applying a strong braking force to the motor 45. Since the motor 45 is cut off from the power supply in a state where emergency braking is necessary, the motor 45 is not rotationally driven by a current from the power supply, and thus safety is improved.

In the step of reversing a direction of the rotational force acting on the motor 45, necessity of emergency braking of the motor 45 may be determined, and when a determination is made that emergency braking of the motor 45 is not necessary, the motor drive circuit 60 may be controlled to switch from a state in which the motor is connected to the power supply to a state in which the motor 45 is cut off from the power supply, or the direction of the rotational force acting on the motor 45 may be reversed without switching from the state in which the motor 45 is connected to the power supply. Accordingly, in the rotation control method for the medical device 10, the shaft portion 20 and the rotatable structure 30 can be quickly decelerated by applying a strong braking force to the motor 45.

In the step of reversing a direction of the rotational force, by controlling the motor drive circuit 60 to switch from a state in which the motor 45 is connected to the power supply to a state in which the motor 45 is cut off from the power supply, the direction of the rotational force acting on the gear box 46 may be reversed by a back electromotive force generated in the motor 45. Accordingly, in the rotation control method for the medical device 10, the shaft portion 20 and the rotatable structure 30 can be quickly decelerated by applying a strong braking force to the motor 45.

The rotation control method includes: a step of stopping generating the reverse rotational force after a preset predetermined time has elapsed since the direction of the rotational force acting on the gear box 46 is reversed by controlling the motor drive circuit 60. Accordingly, control of the controller 50 over a current in the circuit can be simplified, and a stable operation can be performed by shortening a calculation time of the control.

In addition, the rotation control method may include: after the step of reversing a direction of a rotational force acting on the gear box 46, a step of detecting the rotational speed of the motor 45 or the shaft portion 20, and stopping generating the reverse rotational force after detecting that the actual rotation direction of the motor 45 is reversed based on a detection result. Accordingly, since braking can be continued until torsion accumulated in the shaft portion 20 is eliminated, it is possible to repeatedly rotate the rotatable structure 30 by the motor 45 while preventing damage to the shaft portion 20 or the biological tissue.

In addition, the rotation control method may include: after the step of reversing a direction of a rotational force acting on the gear box 46, a step of detecting the rotational speed of the motor 45 or the shaft portion 20, and stopping generating the reverse rotational force when the detected rotational speed reaches a preset threshold value. Accordingly, since braking can be continued until torsion accumulated in the shaft portion 20 is substantially eliminated, it is possible to repeatedly rotate the rotatable structure 30 by the motor 45 while preventing damage to the shaft portion 20 or the biological tissue.

Note that the invention is not limited to the example described above, and various modifications can be made by those skilled in the art within a scope of the technical idea of the invention. For example, a biological lumen into which the medical device 10 is inserted is not limited to a blood vessel, and may be, for example, a vessel, a urinary duct, a bile duct, a fallopian tube, or a hepatic duct. Therefore, an object to be destroyed may not be thrombus.

Rotation directions of the motor 45, the shaft portion 20, and the rotatable structure 30 in each rotation cycle may be the same direction rather than a reverse direction after a stop.

A configuration of the rotatable structure 30 is not particularly limited to the configuration described above, and may not be formed of the wire 31, for example. The rotatable structure 30 only needs to be able to destroy an object in a biological lumen, and for example, an abrasive may be attached or a sharp blade may be formed. The rotatable structure 30 may not destroy an object in a biological lumen. For example, the rotatable structure 30 may be a spiral structure capable of conveying an object by rotating.

What is claimed is:

1. A medical device for removing an object from a biological lumen, comprising:
   a rotatable structure for removing the object;
   a rotatable shaft to which the rotatable structure is connected at a distal portion of the shaft;
   a motor connected to the shaft and configured to generate a rotational force that is applied to the shaft; and
   a motor drive circuit connectable to a power supply and configured to:
      supply a first current to the motor in a first direction to cause the motor to generate a rotational force in a first rotational direction,
      after supplying the first current, supply a second current to the motor in a second direction that is opposite to the first direction to cause the motor to generate a rotational force in a second rotational direction that is opposite to the first rotational direction, and
      after supplying the second current, supply no current to the motor to cause the motor to be in an idle state until the motor stops.

2. The medical device according to claim 1, further comprising:
   a controller configured to control the motor drive circuit, wherein
   the controller is configured to:
      determine necessity of emergency braking of the motor, and
      upon determining that emergency braking is necessary, control the motor drive circuit to disconnect from the power supply.

3. The medical device according to claim 2, wherein when emergency braking is necessary, the controller controls the motor drive circuit to disconnect from the power supply while short-circuiting terminals of the motor.

4. The medical device according to claim 2, wherein when disconnecting from the power supply, a back electromotive force generated in the motor causes a rotational force in the second rotational direction to be applied to the shaft.

5. The medical device according to claim 1, further comprising:
   a controller configured to control the motor drive circuit, wherein
   the controller is configured to:
      determine whether a rotational speed of the motor in the first rotational direction has reached a first predetermined value, and
      when the rotational speed has reached the first predetermined value, control the motor drive circuit to stop the supply of the first current to the motor in the first direction.

6. The medical device according to claim 5, further comprising:
   a sensor configured to detect the rotational speed of the motor.

7. The medical device according to claim 5, wherein the controller is configured to:
   after the motor goes into the idle state, determine whether the rotation of the motor has stopped, and
   when the rotation of the motor has stopped, control the motor drive circuit to supply a third current to the motor in the second direction, wherein
   an intensity of the first current is equal to an intensity of the third current.

8. The medical device according to claim 7, wherein the controller is configured to, after stopping the supply of the first current to the motor in the first direction and before determining that the rotation of the motor has stopped, control the motor drive circuit to decrease the rotational speed of the motor by short braking.

9. The medical device according to claim 7, wherein the controller is configured to:
   when the third current is supplied, determine whether a rotational speed of the motor in the second rotational direction has reached a second predetermined value, and
   when the rotational speed in the second rotational direction has reached the second predetermined value, control the motor drive circuit to stop the supply of the third current to the motor in the second direction.

10. The medical device according to claim 1, wherein the shaft includes a plurality of spiral slits, two of which are connected to each other along a longitudinal direction of the shaft via hooks.

11. A method for controlling a medical device that includes:
    a rotatable structure for removing an object from a biological lumen,
    a rotatable shaft to which the rotatable structure is connected at a distal portion of the shaft, and
    a motor connected to the shaft and configured to generate a rotational force that is applied to the shaft,
    the method comprising:
       supplying a first current from a power supply to the motor in a first direction to cause the motor to generate a rotational force in a first rotational direction;
       after supplying the first current, supplying a second current to the motor in a second direction that is opposite to the first direction to cause the motor to generate a rotational force in a second rotational direction that is opposite to the first rotational direction; and
       after supplying the second current, supplying no current to the motor to cause the motor to be in an idle state until the motor stops.

12. The method according to claim 11, further comprising:
    determining necessity of emergency braking of the motor; and
    upon determining that emergency braking is necessary, disconnecting the motor from the power supply.

13. The method according to claim 12, further comprising:
    when emergency braking is necessary, short-circuiting terminals of the motor.

14. The method according to claim 12, further comprising:
    when disconnecting the motor from the power supply, a back electromotive force generated in the motor causes a rotational force in the second rotational direction to be applied to the shaft.

15. The method according to claim 11, further comprising:
    determining whether a rotational speed of the motor in the first rotational direction has reached a first predetermined value; and
    when the rotational speed has reached the first predetermined value, stopping the supply of the first current to the motor in the first direction.

16. The method according to claim 15, further comprising:
    detecting the rotational speed of the motor using a sensor.

17. The method according to claim 15, further comprising:

after the motor goes into the idle state, determining whether the rotation of the motor has stopped, and when the rotation of the motor has stopped, supplying a third current to the motor in the second direction, wherein an intensity of the first current is equal to an intensity of the third current.

18. The method according to claim 17, further comprising:

after stopping the supply of the first current to the motor in the first direction and before determining that the rotation of the motor has stopped, decreasing the rotational speed of the motor by short braking.

19. The method according to claim 17, further comprising:

when the third current is supplied, determining whether a rotational speed of the motor in the second rotational direction has reached a second predetermined value; and when the rotational speed in the second rotational direction has reached the second predetermined value, stopping the supply of the third current to the motor in the second direction.

20. A medical device for removing an object from a biological lumen, comprising:

one or more expandable wires for removing the object;

a rotatable shaft to which the wires are connected at a distal portion of the shaft;

a motor connected to the shaft and configured to generate a rotational force that is applied to the shaft; and a controller configured to:

control the motor to generate a rotational force in a first rotational direction; and after a rotational speed of the motor has reached a predetermined value, control the motor to generate a rotational force in a second rotational direction opposite to the first rotational direction, and after the rotational force in the second rotational direction is generated, cause the motor to be in an idle state until the motor stops.

* * * * *